(12) United States Patent
Ogata (10) Patent No.: US 6,402,327 B2
(45) Date of Patent: Jun. 11, 2002

(54) LIGHT-REFLECTING MEMBER AND STRAP FOR PORTABLE ELECTRONIC EQUIPMENT

(75) Inventor: Hiroki Ogata, Chiba (JP)

(73) Assignee: Sony Computer Entertainment, Inc., Tokyo (JP)

(*) Notice: Subject to any disclaimer, the term of this patent is extended or adjusted under 35 U.S.C. 154(b) by 0 days.

(21) Appl. No.: 09/955,346

(22) Filed: Sep. 18, 2001

Related U.S. Application Data (63) Continuation of application No. 09/534,422, filed on Mar. 23, 2000, now Pat. No. 6,318,865.

(30) Foreign Application Priority Data

Mar. 26, 1999 (JP) ................................................ 11-84626

(51) Int. Cl.[7] ................................................ G02B 5/12
(52) U.S. Cl. ...................... 359/516; 359/871; 359/880; 359/815
(58) Field of Search .............................. 359/516, 518, 359/519, 815, 838, 871, 879, 880, 882; 472/133

(56) References Cited

U.S. PATENT DOCUMENTS

| | | | |
|---|---|---|---|
| 5,244,135 A | | 9/1993 | Nelson |
| 5,495,357 A | | 2/1996 | Osterhout |
| 5,530,588 A | * | 6/1996 | Vivier ........................ 359/517 |

FOREIGN PATENT DOCUMENTS

DE 44 31 707 A1 9/1995

* cited by examiner

Primary Examiner—Mark A. Robinson
(74) Attorney, Agent, or Firm—Katler Muchin Zavis Rosenman (57) ABSTRACT

It is an object of the present invention to enhance communications functions of a portable electronic equipment (1) that has optical communications functions so that the light beams emitted from other equipment with which it communicates can be adequately received even when the equipment (1) is being carried by a user. According to the present invention, a light-reflecting member (20) is attached to a strap body (10) used to carry the portable electronic equipment (1) in a hanging down position. The light-reflecting member (20) is positioned near a light receiver (4) provided on the top part (1a) of the portable electronic equipment (1) and reflects light beams used for optical communication from the surroundings and guides them to the light receiver (4).

5 Claims, 7 Drawing Sheets

LIGHT-REFLECTING MEMBER AND STRAP FOR PORTABLE ELECTRONIC EQUIPMENT

This application is a continuation of Ser. No. 09/534,422, filed Mar. 23, 2000, now U.S. Pat. No. 6,318,865.

BACKGROUND OF THE INVENTION

1. Field of the Invention

The present invention relates to a light-reflecting member attached to a carrying strap for portable electronic equipment that includes a light receiver(also referred as "photo detector device") and a light emitter and is provided with optical communications functions.

2. Background of the Invention

In recent years, portable electronic equipment having optical communications functions making use of infrared communications technologies and the like has been proposed. This type of portable electronic equipment, typified by portable game devices, allows a plurality of people who each own their own portable game device to exchange data among them, so that characters appearing in the game may be sent to the memory of another device, or game information may be exchanged so that games can be played in real time, along with other functions.

When portable electronic equipment is carried around at all times, the device is typically attached to a strap and hung from the neck or wrist of the owner. In this case, it is unavoidable that the posture of the equipment is much different depending on whether the portable electronic equipment is being used or being carried (when hanging from the neck or wrist or the like using a strap; the same applies hereafter in this specification). For example, when portable electronic equipment is being used, it is typically operated with the information display surface formed in the surface facing up. For this reason, if the portable electronic equipment is equipped with optical communications functions, the light receiver and the light emitter are provided at locations that face other equipment with which it communicates in the in-use posture, namely the top part of the equipment.

On the other hand, when the equipment is being carried by the user, although this depends on the location where the equipment is attached to the strap, it is not carried in the same posture as that when the equipment is in use, and it typically hangs down with the top part where the light receiver and the light emitter are provided pointing up.

Therefore, even if there is a transmission of data using the optical communications functions from other portable electronic equipment while the equipment is being carried, the light receiver is not facing other equipment with which it communicates, so the light beam cannot be received directly. Even if the light beam reflected by a wall or the like in the surroundings can be received, the intensity of the light beam will be greatly attenuated so that the usable range that the beam can reach would be shortened.

If a light receiver is also provided on parts that face other equipment with which it communicates, in the posture when the portable electronic equipment is being carried, this kind of communications interference will be eliminated. However, there is no denying that this would make the portable electronic equipment more complex and larger.

SUMMARY OF THE INVENTION

The present invention was made in light of such circumstances. It is an object of the present invention to enhance the communications functions of portable electronic equipment that has optical communications functions such that a light beam emitted from another equipment with which it communicates can be adequately received even when the equipment is being carried by the user.

In order to achieve the above and other objects of the present invention, a light-reflecting member according to the present invention is one attached to a carrying strap for portable electronic equipment that includes a light receiver and a light emitter and that is provided with optical communications functions, wherein a light beam used in optical communications for the portable electronic equipment is reflected to the light receiver of the portable electronic equipment.

By attaching the light-reflecting member to the carrying strap, the light beams emitted from other equipment with which it communicates are reflected by the light-reflecting member and guided to the light receiver of the portable electronic equipment while the equipment is being carried by the user, so that the optical communications functions of the portable electronic equipment are enhanced even while that equipment is being carried.

The light-reflecting member according to this invention is attached in a desired position on the strap such that light beams emitted from outside (namely, other equipment with which it communicates) can be reflected to the light receiver of the portable electronic equipment.

In addition, the strap according to the present invention is attached with the aforementioned light-reflecting member. For example, in the case where portable electronic equipment is equipped with optical communications functions and has its light receiver for optical communications functions on the top part, it is preferable that the strap is connected to the top portion of the portable electronic equipment and the light-reflecting member that reflects light beams used in the optical communications for the portable electronic equipment be attached in a position near the light receiver.

DETAILED DESCRIPTION OF THE PREFERRED EMBODIMENTS

Figure 1A:
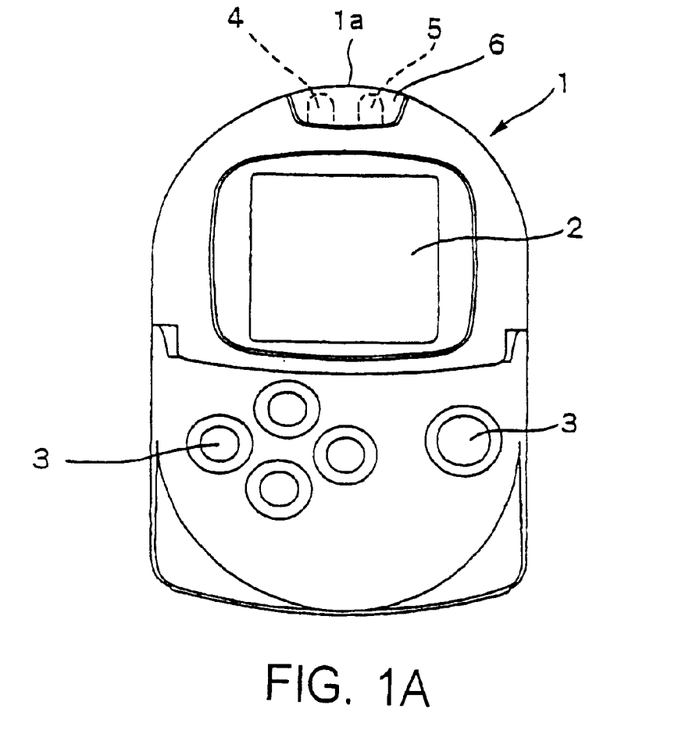
FIG. 1A is a plan view showing a configuration of the portable electronic equipment to be attached to the strap according to an embodiment of this invention.

A detailed explanation of an embodiment of this invention will be now made with reference to drawings. FIG. 1A is a plan view showing a configuration of the portable electronic equipment to be attached to the strap according to an embodiment of the present invention.

Portable electronic equipment 1 shown in FIG. 1A is provided with optical communications functions whereby infrared light or the like is used to permit data to be exchanged between a plurality of units of portable electronic equipment 1 or with another electronic equipment. The portable electronic equipment 1 operates according to a program stored in its built-in memory. For example, in the case that the stored program is a game program, the game content is drawn on a display area 2 consisting of liquid-crystal display or the like, and at the same time, control buttons 3 are operated to play the game. The display area 2 and control buttons 3 are provided on the front surface of the portable electronic equipment 1.

Figure 1B:
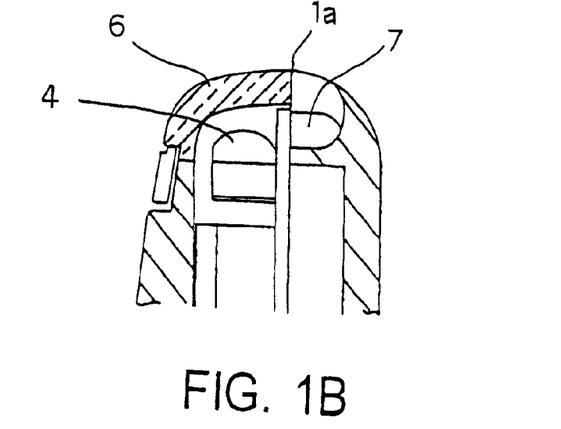
FIG. 1B is a cross-sectional side view showing the configuration of the top part of the portable electronic equipment.

In addition, a light receiver 4 for receiving light beams for use in optical communication and a light emitter 5 for emitting these light beams are built in near the top part 1a of the portable electronic equipment 1. A window 6 consisting of a transparent resin plate is formed at the top part 1a, so that the light receiver 4 receives the light beams used for optical communication through window 6, whereas the light emitter 5 emits the light beams used for optical communication also therethrough. Moreover, as shown in the enlarged view in FIG. 1B, a attachment aperture 7 for connecting to the strap is formed at the top part 1a of the portable electronic equipment 1.

The portable electronic equipment 1 described above is able to use the optical communications functions to exchange data among the portable electronic equipment 1 owned by a plurality of people, for example, or it can be used to remotely activate the portable electronic equipment 1 of other equipment with which it communicates and thus call other equipment with which it communicates, among other uses. In addition, in the event that a remote control program for remotely controlling television sets or other electronic equipment is stored in the built-in memory, the optical communications functions can be utilized to remotely control other types of electronic equipment.

Figure 2:
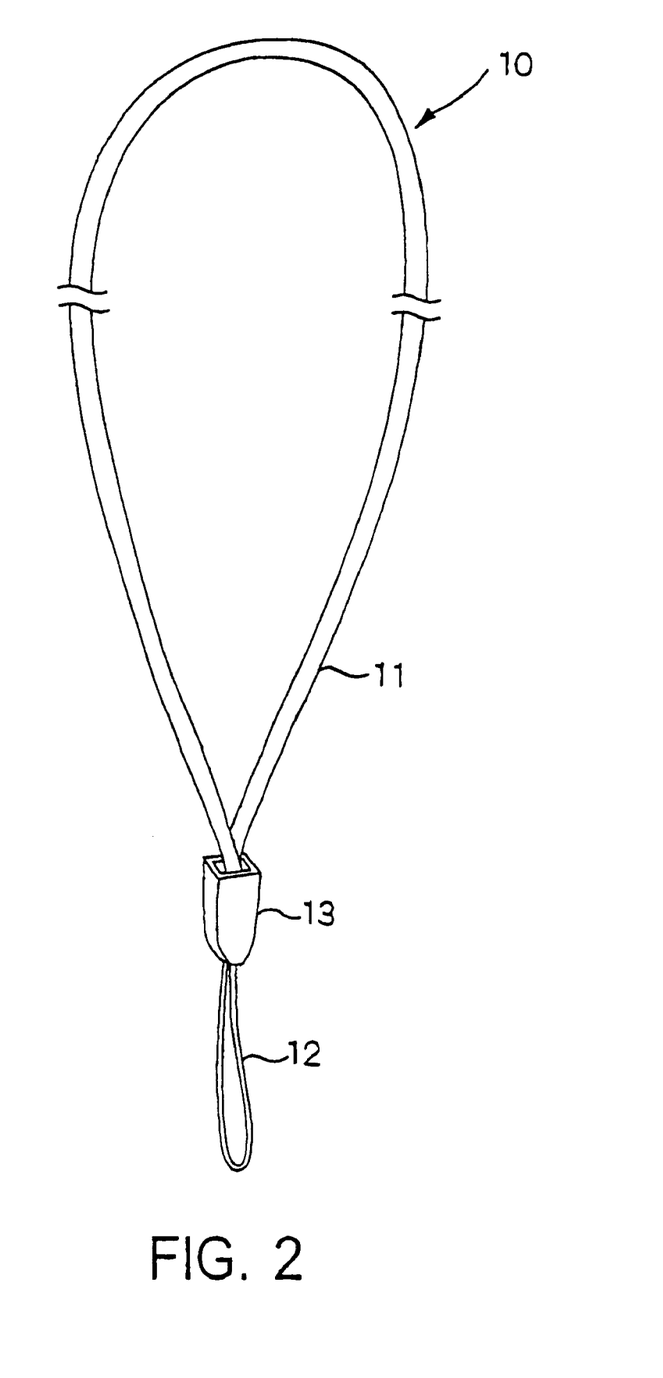
FIG. 2 is a front view showing a configuration of a main part of the strap according to an embodiment of this invention.
Figure 3A:
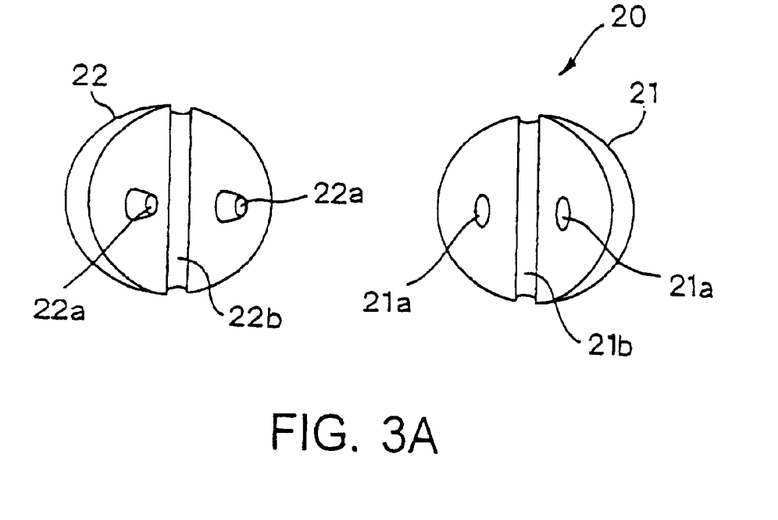
FIG. 3A diagrammatically shows two hemispherical parts, respectively of the light-reflecting member to be attached to the main part of the strap.
Figure 3B:
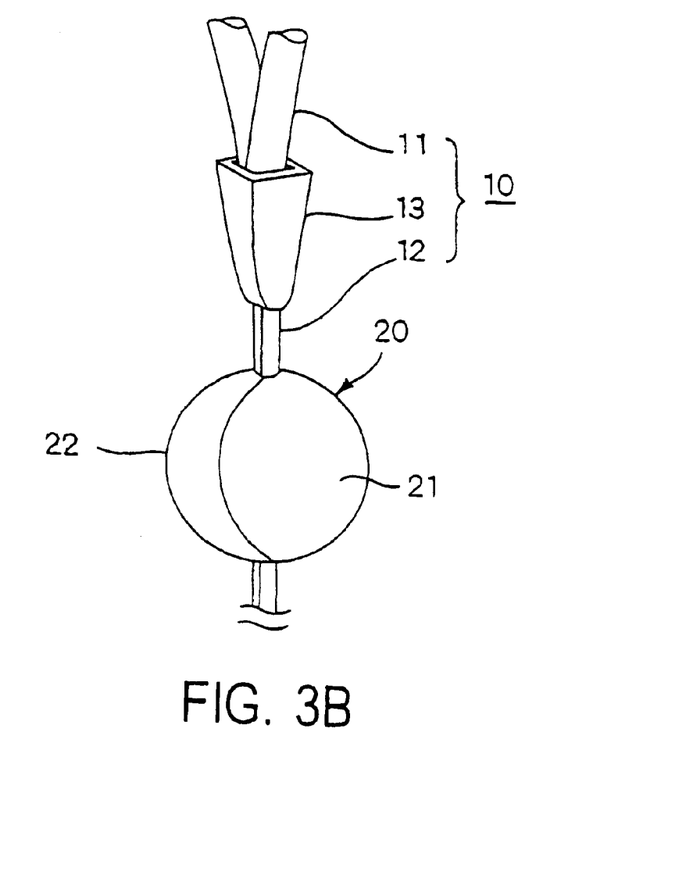
FIG. 3B is a perspective view of the light-reflecting member attached to the strap.

FIG. 2 is a perspective view showing a configuration of the strap according to an embodiment of this invention. FIGS. 3A and 3B show a configuration of the light-reflecting member of the embodiment of the present invention, which is attached to the main part of the strap.

A strap according to an embodiment of this invention includes a strap body 10 and a light-reflecting member 20 that is attached to strap body 10.

Referring to FIG. 2, the strap body 10 includes a hanging cord 11, a thin cord 12 and a connector 13. The hanging cord 11 is a structural element for hanging from the body of the user, and consists of a plain-weave or round weave cloth, vinyl, leather or other material formed into a belt shape. The hanging cord 11 exhibits a looped mode of usage with both ends secured to the connector 13. The length of hanging cord 11 may be set arbitrarily depending on the purpose for which the strap is used. For example, it may be made longer when hung from the neck of the user or the length may be made shorter for hanging from the wrist of the user.

The thin cord 12 is a structural element formed in a loop for attaching to the attachment aperture 7 (FIG. 1B) of the portable electronic equipment 1. The thin cord 12 is made of a flexible, thin and tough material formed into a length of roughly 10 cm, and is secured to the connector 13 like the hanging cord 11.

The connector 13 is a structural element for connecting the hanging cord 11 and thin cord 12 described above, and may be made of plastic or other material. The hanging cord 11 and thin cord 12 are connected and secured within connector 13.

With a strap body 10 of the above configuration, the thin cord 12 is pushed through the attachment aperture 7 of the portable electronic equipment 1, and then the tip of the hanging cord 11 is threaded through the loop of the thin cord 12 extending from the attachment aperture 7, and thus the thin cord 12 is tied around the attachment aperture 7 of the portable electronic equipment 1.

With reference to FIGS. 3A and 3B it will be seen that a light-reflecting member 20 which is made of a material that has good reflective characteristics with respect to the light beams used in the optical communications functions of the portable electronic equipment 1 is attached to the thin cord 12. For example, in the case that the light beams used in optical communications functions are infrared light, light-reflecting members may be made of ABS resin (acrylonitrile-butadiene-styrene resin) or polycarbonate or other plastic materials given the characteristics of being able to reflect the infrared light.

It should be noted that the surface of the light-reflecting member 20 may be electroplated or coated with a layer of material that reflects light beams used in the aforementioned optical communications functions. In this case, the material of the light-reflecting member 20 does not matter.

In this embodiment, as shown in FIG. 3B, the light-reflecting member 20 is formed in a spherical shape and is configured such that it is attached to the thin cord piece of the strap body 10. However, if the light-reflecting member 20 is attached to the thin cord 12 before the strap body 10 is attached to the portable electronic equipment 1, it is difficult to attach the strap body 10 to the portable electronic equipment 1 by the aforementioned sequence.

To solve this problem, as shown in FIG. 3A, in this embodiment two (hemispherical) light-reflecting member halves 21 and 22 each having the shape of a sphere cut in half are manufactured so that they form a spherical light-reflecting member 20 when joined together. To wit, by forming engagement concaves 21a in the joining surface of one reflecting member half 21 and also forming engagement convexes 22a in the joining surface of the other reflecting member half 22 and fitting these parts together, the reflecting member halves 21 and 22 are made integral. Due to this configuration, it is possible to attach the reflecting member 20 to the thin cord 12 after the strap body 10 has been attached to the portable electronic equipment 1.

It is noted that the joining surfaces of the reflecting member halves 21 and 22 respectively have grooves 21b and 22b for inserting therein the thin cord 12, which extend in the center of the halves 21 and 22 from upper ends thereof to lower ends thereof.

Figure 4:
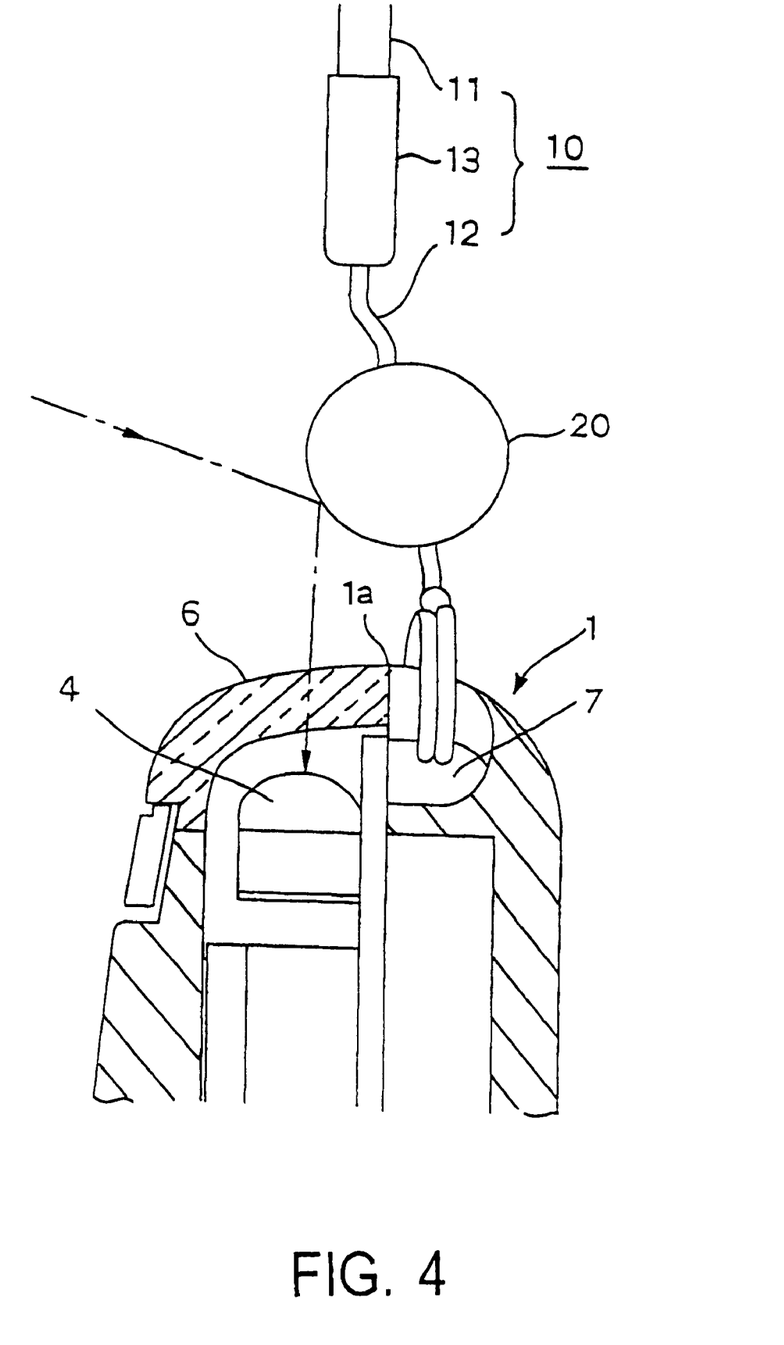
FIG. 4 is a partially cutaway side view showing the positional relationship between the reflecting member and the portable electronic equipment shown in a sectional view.
Figure 5:
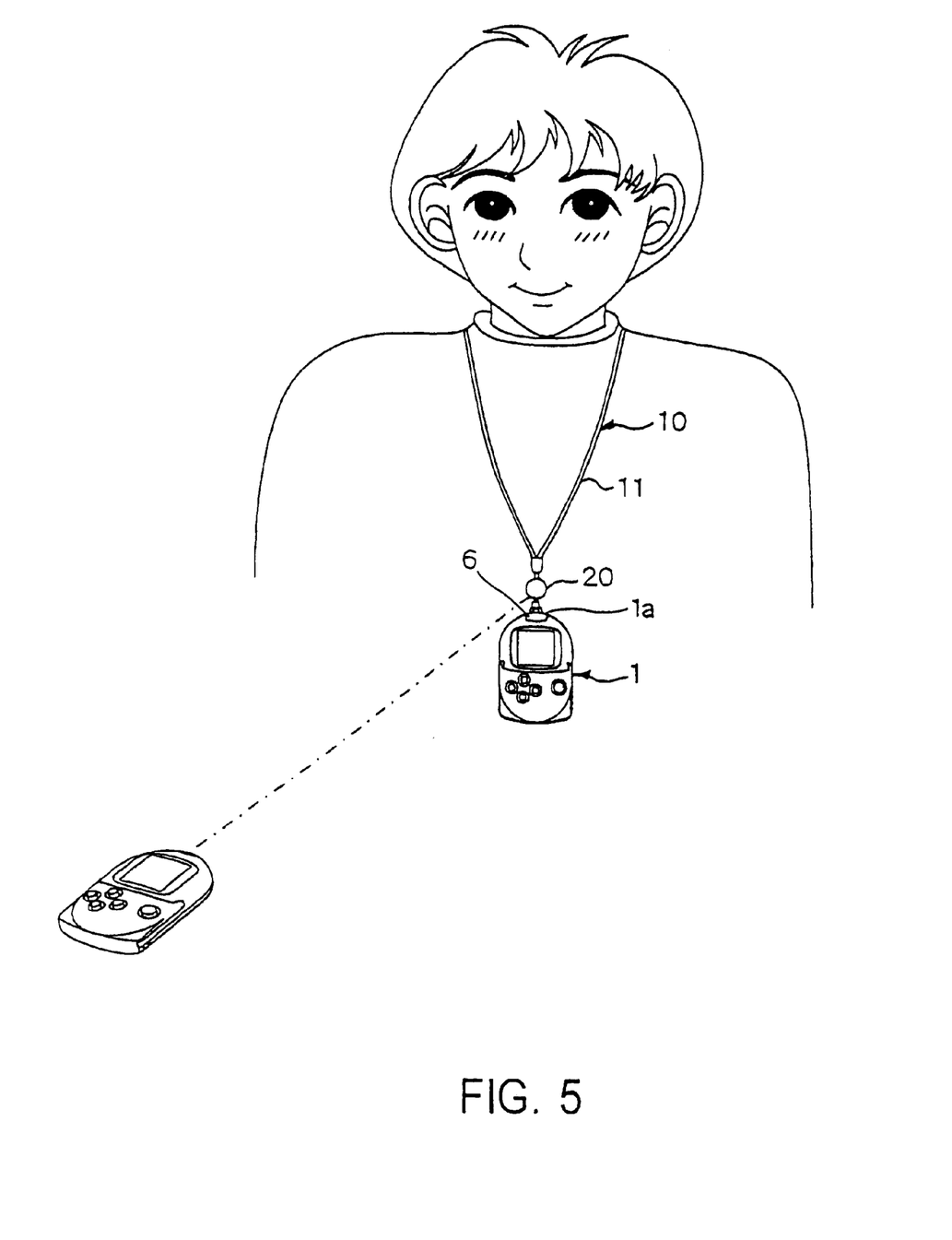
FIG. 5 is a diagrammatical view for explaining the usage of the strap according to the embodiment of the present invention.

FIG. 4 is a partial cutaway side view showing the positional relationship between the light-reflecting member 20 and the portable electronic equipment 1. FIG. 5 shows a diagram used to explain the usage of the strap according to another embodiment of this invention.

As shown in FIG. 4, the light-reflecting member 20 attached to the thin cord 12 of the strap body 10 is disposed near the light receiver 4 in the portable electronic equipment 1. Moreover, as shown in FIG. 5, in the state in which the hanging cord 11 of the strap body 10 is hanging from the neck of the user, the window 6 provided in the top part 1a of the portable electronic equipment 1 faces upwards, and the light-reflecting member 20 is positioned in the vicinity upwards thereof.

Therefore, when the light beams used for optical communication emitted from another portable electronic equipment 1 impinge upon the surface of the reflecting member 20, as shown in FIG. 4, the aforementioned light beams are reflected by the surface of the light-reflecting member 20, pass through the window 6 of the portable electronic equipment 1 and are guided to the light receiver 4. Thereby, the light beams used for optical communication emitted by another portable electronic equipment 1 can be reliably made to enter the light receiver 4 even when the unit is being carried by the user.

On the other hand, when the portable electronic equipment 1 is being used, the surface upon which the display area 2 and control buttons 3 are provided faces upwards, so that the top part 1a is disposed such that it faces horizontally. At this time, the strap will hang downwards below the top part 1a of the portable electronic equipment 1, so that the light-reflecting member 20 moves downward from a position facing the window 6 of the portable electronic equipment 1 (namely the light emitter 5 and light receiver 4). Therefore, the light-reflecting member 20 will not block communication between two portable electronic equipments.

Figure 6:
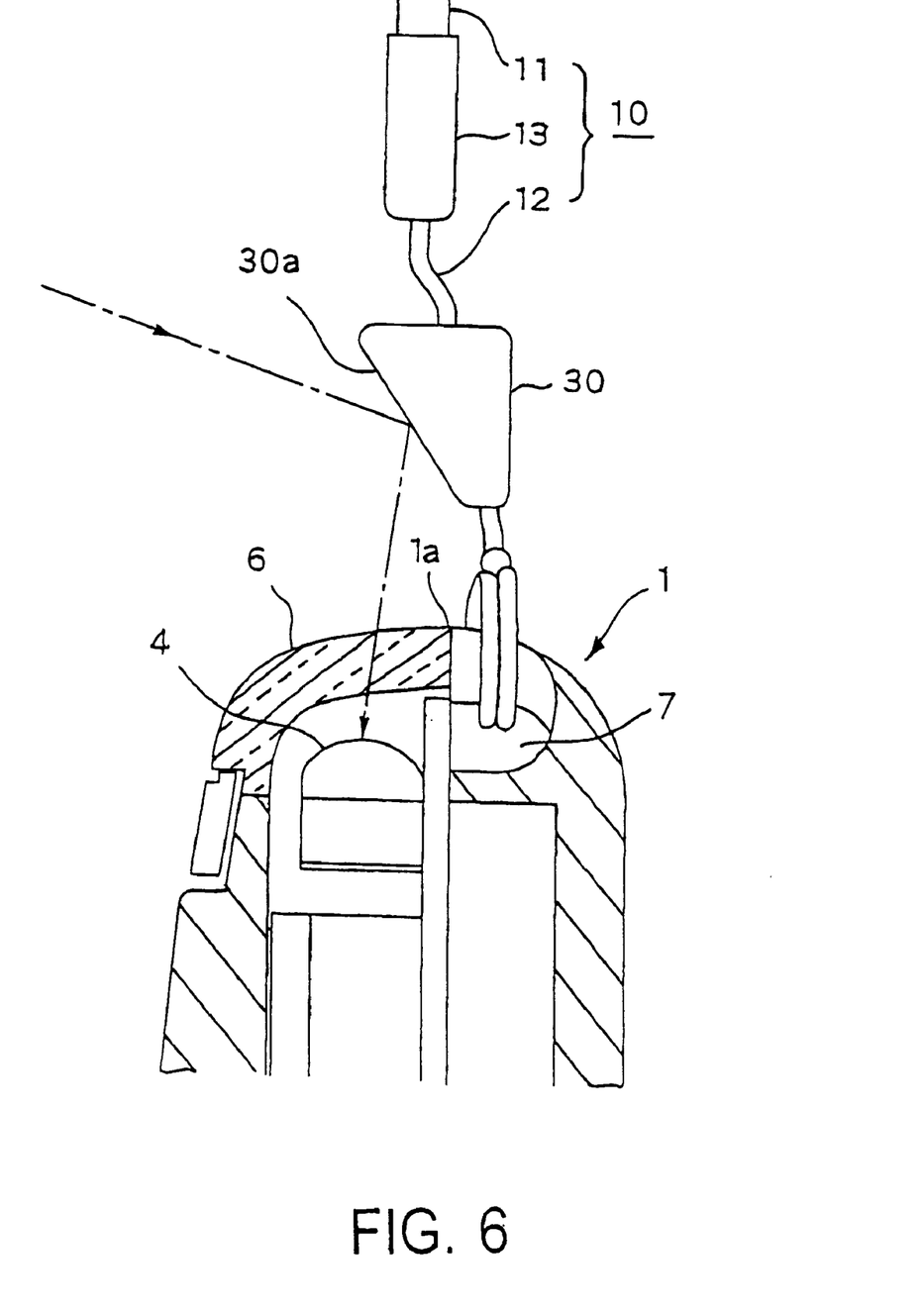
FIG. 6 diagrammatically shows the light-reflecting member according to another embodiment of the invention.

FIG. 6 is a diagram showing the reflecting member according to another embodiment of the invention.

A light reflecting member 30 shown in FIG. 6 is formed with one of its surfaces being a light-reflecting surface. At least this light-reflecting surface is provided with good reflecting properties with respect to the light beams used in the optical communications functions of the portable electronic equipment 1. Moreover, this light-reflecting surface is slanted at a fixed angle with respect to the axis of the strap, and thus when the portable electronic equipment 1 is hanging from the strap (being carried by the user), it is adjusted so that light beams used for optical communication entering from the front can be reflected to the light receiver 4 of the portable electronic equipment 1.

The light-reflecting member 30 shown in FIG. 6 is also attached to the thin cord portion of the strap body 10 and can make the light beams used for optical communication emitted by another portable electronic equipment 1 reliably enter the light receiver 4 even when the unit is being carried by the user.

Figure 7A:
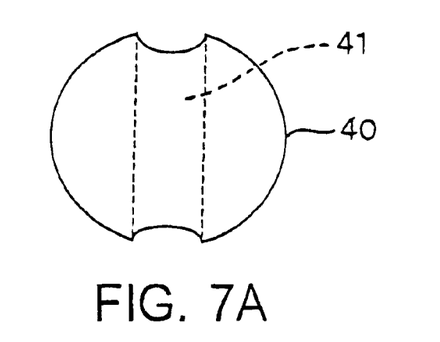
FIG. 7A shows the light-reflecting member according to still another embodiment of this invention.
Figure 7B:
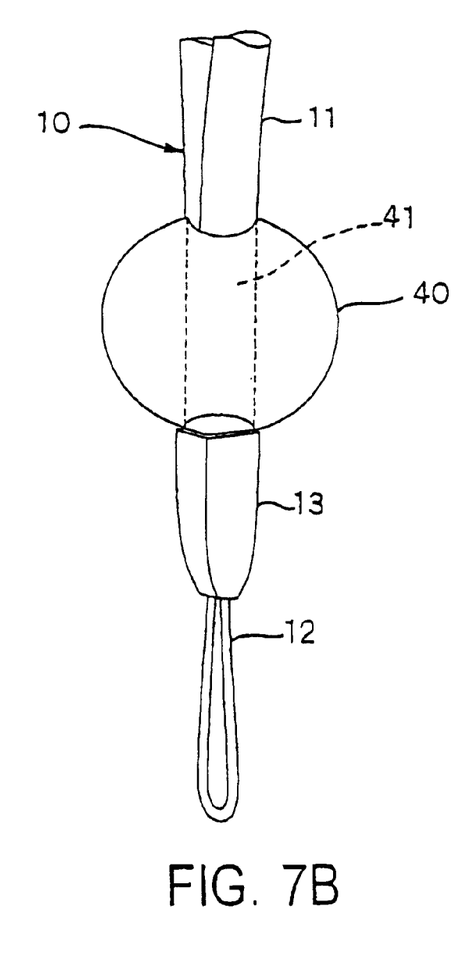
FIG. 7B is partial perspective view of the light-reflecting member of FIG. 7A, attached to the portable electronic equipment.

FIGS. 7A and 7B show the reflecting member according to yet another embodiment of the invention.

In the embodiments described above, the reflecting member was attached to the thin cord 12 of the strap body 10. However, as shown in FIG. 7B, the light-reflecting member 40 may also be disposed such that the hanging cord 11 passes through it and is in contact with the upper edge of the connector 13. As shown in FIG. 7A, the light-reflecting member 40 in this embodiment has a through-hole 41 formed therein from the top edge to the bottom edge of the sphere, and so it can be easily attached to the strap body 10 by simply passing the hanging cord 11 through this through-hole 41.

The light-reflecting member 40 attached in a position in contact with the upper edge of the connector 13 is also disposed near the light receiver 4 in the portable electronic equipment 1. Moreover, when the hanging cord 11 of the strap body 10 is hanging from the neck of the user, the window 6 provided in the top part 1a of the portable electronic equipment 1 faces upward, and the light-reflecting member 40 is present in a position in the vicinity upward thereof.

Therefore, when the light beams used for optical communication emitted from other portable electronic equipment 1 impinge upon the surface of the light-reflecting member 40, the light beams are reflected by the surface of the light-reflecting member 40, pass through the window 6 of the portable electronic equipment 1 and are guided to the light receiver 4. Thereby, light beams used for optical communication emitted by other portable electronic equipment 1 can be reliably made to enter the light receiver 4 even when the unit is being carried.

It is noted that in the above explanation, only the function of the light-reflecting members 20, 30 and 40 for guiding light beams used for optical communication emitted from other portable electronic equipment 1 into the light receiver 4 while the unit has been carried by the user has been described in the explanation. However, the light-reflecting members 20, 30 and 40 can also enhance transmission functions when the unit is being carried. To wit, in the case wherein the control buttons 3 are operated to perform the transmission of data in the state with the hanging cord 11 of the strap body 10 hanging from the neck of the user, the light emitted from the light emitter 5 can be reflected by light-reflecting members 20, 30 and 40 and scattered around the user.

In addition, the light-reflecting member of this invention can have a configuration wherein the surface that reflects the light beams used for optical communication has a smooth surface for reflecting light beams in the desired direction, or this surface may be given a rough surface to cause the diffused reflection of the impinging light beams.

Moreover, this invention may naturally be also applied to straps for carrying portable electronic equipment of a configuration other than that shown in FIG. 1 (various types of portable electronic equipment that are provided with optical communications functions).

According to the present invention as described above, the light-reflecting member is able to guide light beams emitted from another equipment with which the equipment communicates to the light receiver of portable electronic equipment provided with optical communications functions even when the portable electronic equipment is being carried by a user, and thus it can enhance the communications functions of this equipment.

What is claimed is:

1. A portable electronic equipment including a light receiver and a light emitter and having optical communications functions, said electronic equipment comprising:
   a strap connected with said portable electronic equipment; and
   a light reflecting member attached to said strap, wherein said light reflecting member is adapted to reflect beams of light used in optical communications by said portable electronic equipment.

2. The portable electronic equipment as set forth in claim 1, wherein said light reflecting member is attached to an adequate section of said strap that said light reflecting member can reflect to said light receiver of said portable electronic equipment beams of light arriving from an external source.

3. The portable electronic equipment as set forth in claim 1, wherein said light reflecting member is a sphere in shape and has a light reflecting property at least on the surface thereof.

4. The portable electronic equipment as set forth in claim 1, wherein said light reflecting member has a light reflecting face on at least a portion of said light reflecting member.

5. The portable electronic equipment as set forth in claim 1, wherein said beams of light used in said optical communications are of infrared light.

* * * * *